US007087305B2

(12) United States Patent
Chen et al.

(10) Patent No.: US 7,087,305 B2
(45) Date of Patent: *Aug. 8, 2006

(54) FUSER MEMBER WITH TUNABLE GLOSS LEVEL AND METHODS AND APPARATUS FOR USING THE SAME TO FUSE TONER IMAGES

(75) Inventors: Jiann-Hsing Chen, Fairport, NY (US); Andrew Ciaschi, Lima, NY (US); Joseph A. Pavlisko, Pittsford, NY (US); Robert A. Lancaster, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/158,601

(22) Filed: May 30, 2002

(65) Prior Publication Data

US 2003/0224178 A1 Dec. 4, 2003

(51) Int. Cl.

| | |
|---|---|
| ***B32B 25/02*** | (2006.01) |
| ***B32B 27/20*** | (2006.01) |
| ***B32B 27/26*** | (2006.01) |
| ***G03G 15/20*** | (2006.01) |

(52) U.S. Cl. ...................... 428/421; 428/422; 428/447; 428/906; 399/333

(58) Field of Classification Search ................ 399/329, 399/331, 333; 428/36.8, 36.91, 332, 334, 428/421, 422, 447, 448, 906

See application file for complete search history.

(56) References Cited

U.S. PATENT DOCUMENTS

| | | | | |
|---|---|---|---|---|
| 5,035,950 | A * | 7/1991 | Del Rosario | 428/421 |
| 5,716,714 | A * | 2/1998 | Chen et al. | 428/473.5 |
| 6,355,352 | B1 * | 3/2002 | Chen et al. | 428/421 |
| 6,361,829 | B1 * | 3/2002 | Chen et al. | 427/380 |
| 6,517,346 | B1 * | 2/2003 | Chen et al. | 432/60 |

* cited by examiner

*Primary Examiner*—Ramsey Zacharia
(74) *Attorney, Agent, or Firm*—Carl F. Ruoff

(57) ABSTRACT

Disclosed are fuser members, apparatus and methods which employ compositions that can be varied to provide a fused toner image with a selected gloss level. In embodiments, the apparatus and methods employ a fusing member having an outer contact surface thereon which contacts a previously fused toner image under conditions of elevated temperature and pressure. The contact surface has a Gardner G60 gloss of up to about 35 and is comprised of a fluorocarbon thermoplastic random copolymer co-cured with a fluorinated resin, such as polyfluoroethylenepropylene (FEP). In embodiments, the contact surface comprises a fluorocarbon thermoplastic random copolymer co-cured with a fluorinated resin including subunits of:

$$—(CH_2CF_2)x-, —(CF_2CF(CF_3))y-, \text{ and } —(CF_2CF_2)z-,$$

wherein:

x is from 1 to 50 or 60 to 80 mole percent,
y is from 10 to 89 mole percent,
z is from 10 to 89 mole percent, and
x+y+z equals 100 mole percent.

17 Claims, 3 Drawing Sheets

FUSER MEMBER WITH TUNABLE GLOSS LEVEL AND METHODS AND APPARATUS FOR USING THE SAME TO FUSE TONER IMAGES

CROSS REFERENCE TO RELATED APPLICATIONS

Previously U.S. patent application Ser. No. 10/158,604, now U.S. Pat. No. 6,687,483 entitled, "FUSER APPARATUS FOR ADJUSTING GLOSS OF A FUSED TONER IMAGE AND METHOD FOR FUSING A TONER IMAGE TO A RECEIVER", filed concurrently on even date herewith, is related and therefore the teachings of which are incorporated herein by reference in their entirety.

Attention is also directed to the following copending U.S. patent application Ser. Nos. 09/609,561; 09/607,731; 09/608,290; and 09/697,418 filed on Jun. 30, 2000 relating to cured fluorocarbon thermoplastic copolymer compositions, and U.S. patent application Ser. Nos. 09/609,562; 09/608,289; 09/608,362; and 09/608,818 also filed on Jun. 30, 2000, relating to catalysts and low-temperature cure fluorocarbon thermoplastic copolymer compositions. The teachings of each of the above-described applications are also incorporated herein by reference in their entirety.

FIELD OF THE INVENTION

This invention relates to fuser members, methods and apparatus for fixing toner particles to a receiver in an electrostatographic apparatus, such as a digital process color electrophotographic apparatus. More particularly, this invention relates to fuser members, methods and apparatus for fusing toner particles to a receiver to provide a fused toner image with a pre-set, desired gloss level.

BACKGROUND OF THE INVENTION

Heat-softenable toners are widely used in imaging methods such as electrostatography, wherein electrically charged toner particles are deposited imagewise on a dielectric or photoconductive element bearing an electrostatic latent image. Most often in such methods, the toner is then transferred to a surface of another substrate, such as, e.g., a receiver sheet comprising paper or a transparent film, where it is then fixed in place to yield a final desired toner image.

When heat-softenable toners, comprising for example thermoplastic polymeric binders, are employed, the usual method of fixing the toner in place involves applying heat to the toner once it is on the receiver sheet surface to soften it, and then allowing or causing the toner to cool.

One such fusing method comprises passing the toner-bearing receiver sheet through a nip formed by a pair of opposing members, typically in the form of cylindrical rollers, wherein at least one of the members (usually referred to as a fuser member) is heated and contacts the toner-bearing surface of the receiver sheet in order to heat and soften the toner. The other member (usually referred to as a pressure member) serves to press the receiver sheet into contact with the fuser member. In some other fusing methods, the configuration is varied and the "fuser member" or "pressure member" can take the form of a flat plate or belt.

The desired gloss of the fused electrostatographic images can vary depending on the thermoplastic binder used for the toner, the materials used for the surfaces of the fuser and/or pressure members, and conditions employed during the fusing step as mentioned briefly hereinafter. Typically, it is preferred that multicolor pictorial images have a glossy finish and monochromatic text and graphics have a matte finish.

Several methods for imparting glossy or matte finishes to an image have been disclosed. One method is to cover a multicolor toner image with clear, glossy toner. The clear toner can be laid down in an image configuration or it can be laid down uniformly over the whole image. See, for example, Crandall, U.S. Pat. No. 4,828,950 and Ng, U.S. Pat. No. 5,234,783.

Another method to provide glossy pictorial toner images, produced in an undercolor removal apparatus, is to lay a black matte toner down first and completely cover it by a color (cyan, magenta, yellow) toner having a more glossy finish after fusing. Examples of such methods are described in Japanese Patent Application No. 133422/87, Laid Open No. 300254/88, Dec. 7, 1988. Additional references which disclose the use of glossy and matte toner combinations include Japanese Patent Application No. 90JP-333829, Laid Open No. C92-132261, and U.S. Pat. Nos. 5,162,860 and 5,256,507.

The use of different fuser rollers or finishing apparatus to effect the gloss of a fused toner image has been considered. It has been disclosed that hard metallic rollers covered with a fluorocarbon resin can be used to produce fused toner images having high gloss. On the other hand, most soft rubber coated rollers impart a matte finish to fused images.

U.S. Pat. No. 5,118,589 discloses the use of pressure members with a predefined surface finish to impart either gloss or texture to a heat softenable layer of a receiver onto which color toner particles have been thermally transferred. The use of textured pressure members to impart texture to fixed toner images has also been disclosed in U.S. Pat. Nos. 4,258,095 and 5,085,962. U.S. Pat. No. 5,019,869 discloses an electrophotographic device in which a finish is applied to a toner image by selecting one of a plurality of finishing rollers, each roller having a different and distinct surface texture. Further, U.S. Pat. No. 5,319,429 illustrates the use of a fusing apparatus comprising two endless belts each having a glossy surface to provide glossy images.

U.S. Pat. No. 4,639,405 discloses an apparatus for providing glossy fused toner images which passes toner-bearing receivers sequentially through a first and second pair of rollers, the first pair of rollers fuses the toner, and the second pair of rollers provides gloss to the toner image.

Another method for affecting the gloss of an electrophotographic image is to change the toner binder resin rheology, and therefore, the melt flow characteristics of the toner composition. A toner which has higher melt flow properties at a given temperature, provides higher image gloss as compared to a toner formulation which has lower melt flow properties. Because the melt viscosity of a polymer changes as a function of the weight average molecular weight, substantial changes in the melt viscosity of a toner can be achieved by controlling the molecular weight of the toner binder. References which disclose that changing the molecular weight can affect the gloss include U.S. Pat. Nos. 4,913,991 and 5,258,256.

The amount of crosslinking in the toner binder polymer also can affect gloss. Typically, toners having high crosslinked polymer binders provide matte images. An example of such toner for the purpose of providing a low gloss image is detailed in U.S. Pat. No. 5,395,723.

U.S. Pat. No. 5,334,471 teaches a method of controlling gloss in an electrophotographic toner image by utilizing light-scattering particles of a specific size range. The light-scattering particles are large enough to provide a bumpy image surface which is said to impart low gloss.

As described above, in electrostatographic processes using toners, matte or glossy finishes of the fused toner image can be provided either by controlling the rheological behavior of the toner binder polymer or by controlling the surface texture of the fusing members. However, even with these materials, it has generally not been possible to easily adjust the gloss capabilities of the fuser member by a simple adjustment of the materials used to make the fuser member. It would be desirable to have an ability to make a fuser member having a pre-determined gloss for the fusing surface, as this would enable such fuser member to fuse toner images to a desired gloss specification.

Therefore, as can be seen, a need exists for improved compositions, methods and apparatus to produce fused toner images which meet a pre-selected gloss level.

SUMMARY OF THE INVENTION

The foregoing objects and advantages are provided by the present invention, which in one aspect, relates to a fuser member comprising a support and a layer overlying the support. The layer includes a fluorocarbon thermoplastic random copolymer co-cured with a fluorinated resin and has a contact surface with a G60 gloss of up to about 35.

In embodiments, the fuser member comprises a support and a layer overlying the support. The layer includes a cured mixture comprised of a fluorocarbon thermoplastic random copolymer, a curing agent having a biphenol residue, an acid accelerator, a fluorinated resin, and an aminosiloxane. The cured fluorocarbon thermoplastic random copolymer includes subunits of:

$$—(CH_2CF_2)x\text{-}, —(CF_2CF(CF_3))y\text{-}, \text{ and } —(CF_2CF_2)z\text{-},$$

wherein:

x is from 1 to 50 or 60 to 80 mole percent, y is from 10 to 89 mole percent, z is from 10 to 89 mole percent, x+y+z equals 100 mole percent, and the layer has a contact surface thereon with a G60 gloss of up to about 35.

In another aspect, the invention relates to apparatus for fusing a toner image to a receiver medium to obtain a desired level of gloss for the resulting fused toner image. The apparatus comprises:

a fusing member which contacts the toner image on the receiver medium and fuses the toner image to said receiver medium, the fusing member comprising an outer layer having a contact surface thereon comprised of a fluorocarbon thermoplastic random copolymer co-cured with a fluorinated resin and having a G60 gloss of up to about 35;

a pressure member positioned adjacent to and in contact with the outer contact surface of the fusing member such that a pressure nip is formed between the contact surface of the fusing member and the pressure member; and a heat source for transferring heat to at least one of the fusing member and the pressure member so that heat is transferred to the toner image under pressure while the toner image is passed through the pressure nip.

In embodiments, the apparatus for fusing a toner image to a receiver medium to obtain a desired level of gloss for the resulting fused toner image comprises:

a fusing member which contacts the toner image on the receiver medium and fuses the toner image to said receiver medium, the fusing member comprising an outer layer having a contact surface thereon comprised of the reaction product of a mixture comprising a fluorocarbon thermoplastic random copolymer, a curing agent having a bisphenol residue, an acid accelerator, a fluorinated resin, and an aminosiloxane, the contact surface having a G60 gloss of up to about 35;

a pressure member positioned adjacent to and in contact with the outer contact surface of the fusing member such that a pressure nip is formed between the contact surface of the fusing member and the pressure member; and a heat source for transferring heat to at least one of the fusing member and the pressure member so that heat is transferred to the toner image under pressure while the toner image is passed through the pressure nip.

In another aspect, the invention relates to a method of fusing a thermoplastic toner image to a receiver medium to provide a fused toner image thereon with a desired amount of gloss. The method comprises contacting the receiver with the thermoplastic toner image thereon with a contact surface comprised of a fluorocarbon thermoplastic random copolymer co-cured with a fluorinated resin. The contact surface has a G60 gloss of up to about 35 and the contact is under conditions of temperature and pressure such that the toner image is fused to the receiver medium.

In embodiments, the method comprises the steps of contacting the receiver with the toner image thereon with a contact surface having a G60 gloss of up to about 35 and comprising a cured mixture which includes a fluorocarbon thermoplastic random copolymer, a curing agent having a biphenol residue, an acid accelerator, a fluorinated resin, and an aminosiloxane. The cured fluorocarbon thermoplastic random copolymer has subunits of:

$$—(CH_2CF_2)x\text{-}, —(CF_2CF(CF_3))y\text{-}, \text{ and } —(CF_2CF_2)z\text{-},$$

wherein:

x is from 1 to 50 or 60 to 80 mole percent, y is from 10 to 89 mole percent, z is from 10 to 89 mole percent, x+y+z equals 100 mole percent.

Contact is under conditions of temperature and pressure such that the thermoplastic toner image is fused to the receiver medium.

These aspects of the invention are discussed in more detail hereinbelow.

DETAILED DESCRIPTION OF THE INVENTION

Figure 1:
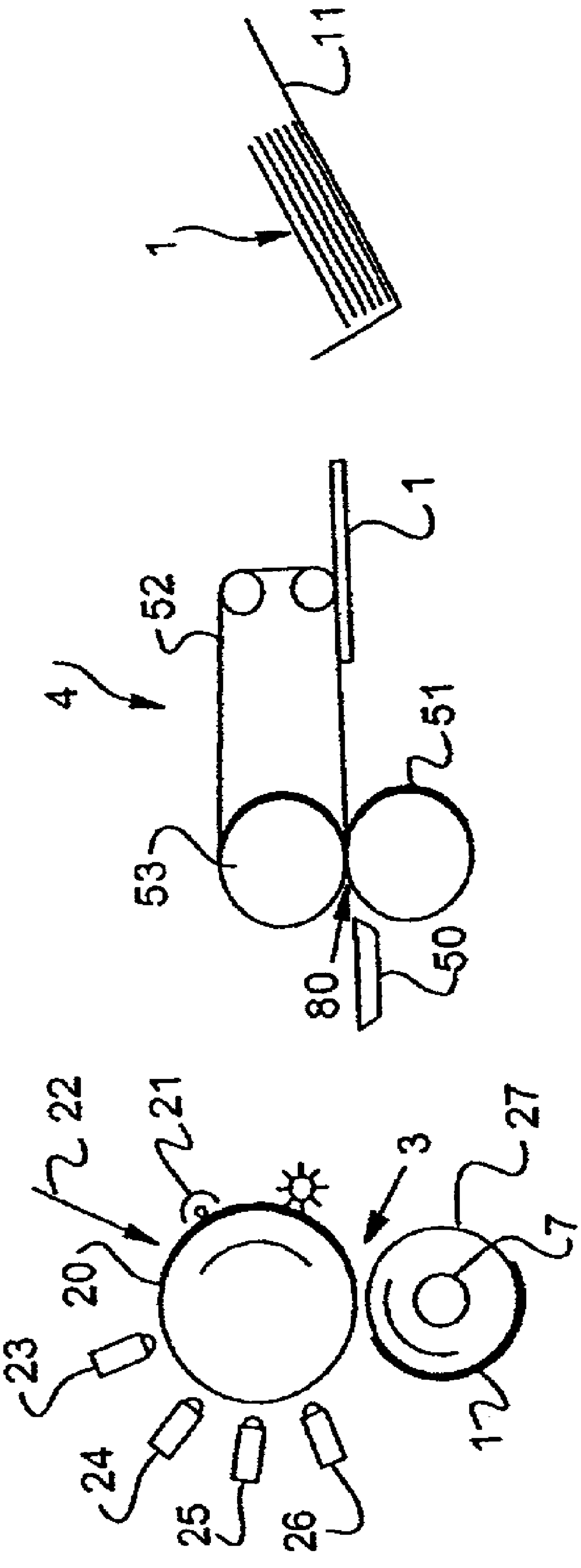
FIG. 1 is a side schematic illustrating a type of image forming apparatus employed in accordance with the invention.

Referring to FIG. 1, a series of electrostatic images are formed on an image member 20 using electrophotography as generally known in the art. While the present invention can be used in black and white electrophotography, it is particularly desirable for process color digital electrophotography, such as for example that which employs a developer set comprised of a thermoplastic resin material in the form of a cyan toner, magenta toner, yellow toner, and optionally, a black toner to develop the electrostatic images. More specifically, image member 20 is uniformly charged by a charging device 21 and thereafter exposed by an exposing device, such as for example, a laser 22 to create the series of electrostatic images. Each of the images is toned by one of toning stations 23, 24, 25 and 26 (each of which employs a toner from the above-described 4-color, multicolor toner set) to create a series of different color toner images corresponding to the electrostatic images.

The receiver sheet 1 is attached to the periphery of an image transfer member 27 and rotated through a transfer nip 3 to transfer the electrostatic images on the image member 20 to the receiver sheet 1 in registration to form a multicolor image thereon. Transfer can be accomplished by heating transfer member 27 internally with a quartz lamp 7 to soften the toner being transferred. Transfer can also be assisted with an electrostatic field.

The receiver sheet 1 bearing the toner image thereon is separated from image transfer member 27 and then fed to further apparatus to be fused to the receiver sheet. For example, as shown in FIG. 1, the toner image is fused to the receiver sheet by use of a fusing system 4 which receiver sheet bearing the fused and finished toner image is finally deposited in an output tray 11.

Fusing system 4 can include an optional preheating device 50 which raises or maintains the temperature of the receiver sheet, a pair of opposed pressure rollers 51 and 53, and an endless fusing belt 52 trained about a series of rollers which includes roller 53. Rollers 51 and 53 are urged together with sufficient force to create substantial pressure in a fusing or fixing nip 80 formed between fusing belt 52 and pressure roller 51. At least one of rollers 51 and 53 is generally heated to raise or maintain the temperature of the toner above its glass transition temperature, using for example, quartz lamps (not shown) positioned within rollers 51 and/or 53. Alternatively, the rollers can be externally heated by use of external heater rollers, lamps, or other heat sources known in the art. The heat and pressure combination within fusing nip 80 causes the toner to soften and bond to the receiver sheet. The receiver sheet bearing the fused toner image thereon continues out of the fusing nip 80 while maintaining contact with belt 52 until the receiver sheet has cooled to a desired temperature, such as below the glass transition temperature of the toner. At this point, receiver sheet 1 is separated from belt 52. Cooling of the toner image before separation can allow for separation without the use of offset-preventing liquids which could degrade the fused toner image.

An example of a typical fusing system employed in the present invention is described in U.S. Pat. No. 5,778,295, the teachings of which are incorporated herein by reference in their entirety.

Figure 2:
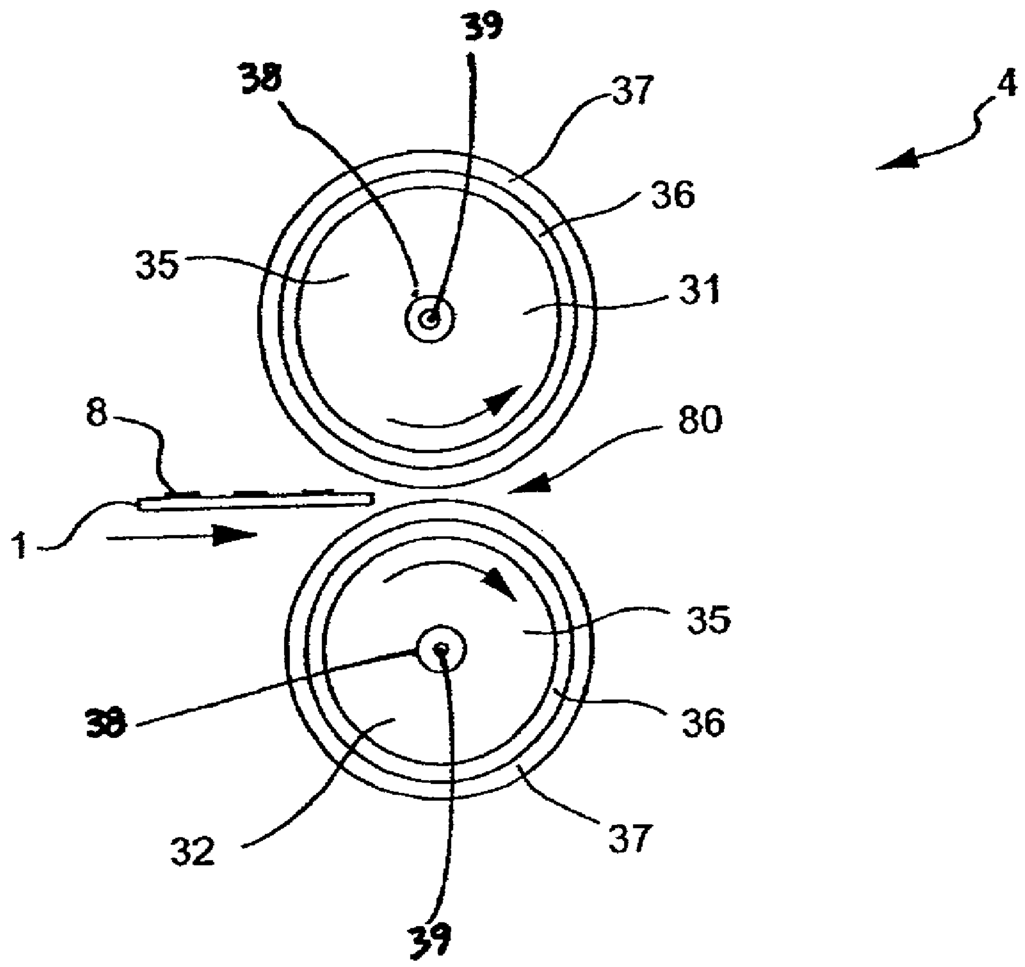
FIG. 2 is a side sectional view of another embodiment of a fusing apparatus according to the invention.

Alternatively, fusing system 4 can take the form of opposed pressure members in a roller form as in the arrangement illustrated for example by FIG. 2. Referring now to FIG. 2, fusing system 4 can comprise an internally heated fuser roller 31 and a pressure roller 32. Fuser roller 31 and pressure roller 32 are in pressurized contact forming a fusing nip 80 through which a receiver sheet 1 bearing a toner image 8 passes. Fuser roller 31 and pressure roller 32 rotate in the direction of the arrows shown on the respective rollers, and receiver sheet 1 moves through the fusing nip 80 in the direction of the arrow shown below the receiver sheet 1 in FIG. 2. In actual operation, fuser roller 31 and pressure roller 32 typically contact each other under pressure to form fusing nip 80, but they are not shown to be in contact in FIG. 2 for purposes of illustration. Passing the receiver sheet 1 between rollers 31 and 32 fuses the toner image 8 to the receiver sheet 1.

As shown in FIG. 2, the fuser roller 31 and the pressure roller 32 are coated with one or more layers of materials, such as an outer layer 37 with a contact surface comprising the fluorocarbon thermoplastic random copolymer co-cured with a fluorinated resin material as mentioned hereinafter, and also layers comprised of silicone elastomers, fluoroelastomers, and so-called interpenetrating networks of silicone and fluoroelastomers. The elastomeric materials are disclosed, for example, in U.S. Pat. Nos. 5,141,788; 5,166,031; 5,281,506; 5,366,772; 5,370,931; 5,480,938; 5,846,643; 5,918,098; 6,037,092; 6,099,673; and 6,159,588; the teachings of which are incorporated herein by reference. The fuser roller 31 and the pressure roller 32 typically comprise a cylindrical core 35 with one or more layers, such as layers 36 and 37, of polymeric materials coated on them.

The core 35 which can be any material which is mechanically and dimensionally stable at the operating temperatures employed for adjusting gloss with fusing system 4. For example, core 35 can be made of a high-temperature resistant plastic material like polyamide-imides, or a metal like aluminum. Preferably, the core 35 is made of a thermally conductive metal, such as aluminum, particularly when the fusing member is heated by internal means, and is more preferably in a cylindrically-shaped hollow tube or solid rod form. In FIG. 2, the core 35 is shown to be in a hollow, cylindrical rod shape, with a heat source supplied within hollow portion 38 by use of a quartz lamp 39. However, a heat source external to the finishing member can also be employed, such as through use of a heated plate, radiant quartz lamp, external heater roller, or any other heat source known in the art.

Disposed on core 35 is an optional, but preferred, base cushion layer 36, as illustrated by FIG. 2, made of a conformable, complaint material so as to generate a desirable contact area within contact nip 80. This area, which can be described as a contact nip width, can be generally from about 0.25 millimeters (mm) (10 mils) to about 12.5 mm (500 mils), and preferably from about 3.2 mm (128 mils) to about 6.4 mm (256 mils) in distance, within contact nip 80. By the term "nip width", it is meant the distance between 1) the receiver sheet entry point to the contact nip 80 and 2) the receiver sheet exit point from contact nip 80. More preferably, the compliant material is a polymeric elastomer described hereinafter, and more preferably a silicone elastomer so as to provide not only a conformable, compliant material, but also high temperature resistance and mechanical stability. Disposed over the optional base cushion layer 36 is an outer layer 37.

Outer layer 37 has a contact surface, which surface contacts the thermoplastic toner image on the receiver member during fusing, that comprises a fluorocarbon thermoplastic random copolymer co-cured with a fluorinated resin material as described hereinafter. In a preferred embodiment, the fusing system employs members, such as the pair of opposed roller members 31 and 32, wherein both members have an outer layer 37 which has a contact surface comprised of the cured fluorocarbon thermoplastic random copolymer composition. In this way, receiver sheets bearing thermoplastic toner images on both sides thereof (as in a duplex printing operation) can be conveniently passed through the fusing system for fixing in a single pass. However, if single pass fusing is not desired, the outer layer 37 of pressure roller 32 does not have to comprise the fluorocarbon thermoplastic random copolymer co-cured fluorinated resin material, and can in that instance be any other material used in the art for such pressure rollers, such as the elastomeric materials previously mentioned herein.

In general, where a base cushion layer is employed, the thickness of the combined base cushion layer and outer layer is desirably from between about 0.25 mm (10 mils) to about 12.5 mm (500 mils). Each layer is described below.

The optional base cushion layer 36 can be of any poly (organosiloxane), such as a poly(dialkylsiloxane), poly (alkylarylsiloxane), or poly(diarylsiloxane) as described in U.S. Pat. No. 5,587,245, the teachings of which are incorporated herein by reference, or a fluoroelastomer material, such as Viton® fluoroelastomers available from DuPont of Wilmington, Del., or so-called interpenetrating networks of siloxane elastomers and fluoroelastomers as previously mentioned in connection with the fuser member of fusing system 4. Preferably, the base cushion is made of a poly (organosiloxane) polymer, since siloxane polymers are generally softer and more conformable relative to fluoroelastomers. Such poly(organosiloxane) polymers can be formed by condensation or addition polymerization methods well known in the art.

In general, the poly(organosiloxane) material employed for the base cushion layer 36 in embodiments comprises a polymerized reaction product of:

(a) at least one cross-linkable poly(organosiloxane);

(b) at least one cross-linking agent;

(c) optionally, an amount of at least one particulate filler; and (d) a cross-linking catalyst in an amount effective to react the poly(organosiloxane) with the cross-linking agent.

The polymerization may be a condensation-type reaction of hydroxy-substituted poly(organosiloxanes) materials, or addition-type reaction of vinyl-substituted poly(organosiloxanes) with hydride-substituted cross-linking agents, as generally known within the art.

It is preferred to use a cross-linkable poly(dialkylsiloxane), and more preferably a poly(dimethylsiloxane), which, before crosslinking, has a weight average molecular weight of from about 10,000 to 90,000.

In one preferred embodiment, the base cushion layer 36 comprises an addition polymerized poly(dialkylsiloxane), and more preferably a poly(dimethylsiloxane). In this embodiment, the base cushion preferably comprises the addition polymerized reaction product of:

(a) at least one cross-linkable, poly(dialkylsiloxane), wherein the poly(dialkylsiloxane) is preferably a vinyl-substituted poly ($C_{1-8}$ alkylsiloxane) with terminal and/or pendant vinyl group functionality and a weight-average molecular weight before cross-linking of about 1,000 to about 90,000;

(b) from about 1 to about 50 parts by weight per 100 parts of poly (dialkylsiloxane) of finely divided filler;

(c) at least one cross-linking agent comprising a multifunctional organo-hydrosiloxane having hydride functional groups (Si—H) capable of reacting with the vinyl functional groups of the poly(dialkylsiloxane); and (d) at least one cross-linking catalyst present in an amount sufficient to induce addition polymerization of the poly (dialkylsiloxane) with the organo-hydrosiloxane cross-linking agent.

The addition-crosslinked poly(dialkylsiloxane) can be formed by addition polymerization of vinyl-substituted multifunctional siloxane polymers with multifunctional organohydrosiloxanes, as is generally described in U.S. Pat. Nos. 5,587,245 and 6,020,038, the teachings of which are incorporated herein by reference. Such vinyl-substituted multifunctional poly(dialkylsiloxane) polymers and their preparation are known in the art. These materials are commercially available from United Chemical Technologies, Inc., Piscataway, N.J., under various designations depending upon the viscosity and molecular weight desired.

The addition cross-linking reaction is carried out with the aid of a compound including a late transition metal catalyst, such as cobalt, rhodium, nickel, palladium or platinum.

The amount of filler employed in base cushion layer 36 depends on the level of thermal conductivity desired therein. For example, if the fuser roller 31 or pressure roller 32 includes an internal heat source as previously mentioned, it would be desirable to incorporate thermally conductive filler therein to facilitate transfer of heat through the base cushion layer 36. The thermally conductive filler can be selected from inorganic metal oxides, such as aluminum oxide, iron oxide, chromium oxide, tin oxide, zinc oxide, copper oxide and nickel oxide. Silica (silicon dioxide) can also be used, as well as silicon carbide. The particle size of the filler does not appear to be critical. Particle sizes anywhere in the range of 0.1 to 100 micrometers are acceptable. The amount of filler employed can be from about 1 to about 50 parts by weight per 100 parts of the siloxane polymer.

A commercially available material for forming a crosslinked, addition-polymerized polyorganosiloxane is GE862 silicone rubber available from GE Silicones, Waterford, N.Y. or S5100 silicone rubber available from Emerson Cuming Silicones Division of W.R. Grace and Co. of Lexington, Mass.

In addition, condensation-type poly(organosiloxanes) are also used to form base cushion layer 36. In this embodiment, the base cushion layer can comprise the condensation polymerized reaction product of:

(a) at least one cross-linkable, poly(organosiloxane) wherein the poly(organosiloxane) is preferably a hydroxy-substituted poly($C_{1-8}$ dialkylsiloxane) with terminal and/or pendant hydroxyl group functionality and a weight-average molecular weight before cross-linking of about 1,000 to about 90,000;

(b) from about 1 to about 50 parts by weight per 100 parts of the poly (organosiloxane) of finely divided filler;

(c) at least one multifunctional silane cross-linking agent having functional groups capable of condensing with the hydroxyl functional groups of the poly(organosiloxane); and (d) at least one cross-linking catalyst present in an amount sufficient to induce condensation polymerization of the poly(organosiloxane) with the multifunctional silane cross-linking agent.

Examples of preferred materials for use as a poly(organosiloxane), are condensable poly(dimethylsiloxanes) and fillers such as those disclosed in U.S. Pat. No. 5,269,740 (copper oxide filler), U.S. Pat. No. 5,292,606 (zinc oxide filler), U.S. Pat. No. 5,292,562 (chromium oxide filler), U.S. Pat. No. 5,548,720 (tin oxide filler), and U.S. Pat. No. 5,336,539 (nickel oxide), the teachings of which are incorporated herein by reference. Silanol-terminated poly(dialkylsiloxanes) are also commercially available from United Chemical Technologies, Inc. of Piscataway, N.J.

The condensation reaction is carried out with the aid of a catalyst, such as, for example, a titanate, chloride, oxide, or carboxylic acid salt of zinc, tin, iron, or lead. Specific examples of useful condensation catalysts are dibutyltin diacetate, tin octoate, zinc octoate, dibutyltin dichloride, dibutyltin dibutoxide, ferric chloride, lead dioxide, or mixtures of catalysts such as CAT50® catalyst sold by Grace Specialty Polymers of Lexington, Mass. CAT50® catalyst is believed to be a mixture of dibutyltin dibutoxide and dibutyltin dichloride diluted with butanol.

Suitable fillers to provide a desired level of thermal conductivity include those previously described.

To form the base cushion layer 36 of fuser roller 31 or pressure roller 32 with a cured poly(organosiloxane), at least one poly(organosiloxane), a stoichiometric excess amount of multifunctional silane to form crosslinks with the hydroxy or vinyl end groups of the poly(organosiloxane), and filler (as desired) are thoroughly mixed by any suitable method, such as with a three-roll mill. The mixture is degassed and injected into a mold surrounding the core to mold the material onto the core according to known injection molding methods. The so-treated core is kept in the mold for a time sufficient for some cross-linking to occur (e.g., generally at least about 4 hours) and allow the core to be removed from the mold without damage thereto. The so-coated member is then removed from the mold and maintained at a temperature of from about 25 to about 100° C. for at least about 1 hour so as to substantially complete reaction and/or accelerate remaining cross-linking.

The base cushion layer 36 can have a thickness that varies, but is preferably from about 0.25 mm (10 mils) to about 12.5 mm (500 mils) thick, and more preferably from about 3.2 mm (128 mils) to about 6.4 mm (256 mils) thick.

The base cushion layer 36 desirably has a hardness of from about 10 to about 80 Shore A, and preferably from about 20 to about 70 Shore A.

To form the outer layer 37 thereon, core 35 after being coated with the base cushion layer 36, is corona discharge treated to prepare the surface of the base cushion for application of the outer layer material. The outer layer 37 may then be directly applied thereto by forming a solution (as described hereinafter) of a mixture comprised of uncured fluorocarbon thermoplastic random copolymer, a fluorinated resin, aminosiloxane, bisphenol residue cure agent, reactive filler including zinc oxide, and any other desired additives. The solution is then applied to the base cushion coated core by known solution or ring coating methods, and cured as described below to obtain the desired product.

If a base cushion layer 36 is not desired, then the outer layer 37 may be directly applied to the core 35 by the foregoing coating method and cured.

According to the present invention, outer layer 37 comprises a co-cured fluorocarbon thermoplastic random copolymer and fluorinated resin material, preferably those disclosed in U.S. patent application Ser. No. 09/609,561 filed on Jun. 30, 2000 and the related applications mentioned above, the teachings of which have been incorporated herein by reference in their entirety. By "cured", it is meant that the fluorocarbon thermoplastic random copolymer and fluorinated resin starting materials are reacted together with curing agents, such that the resulting product is not thermoplastic in nature and retains its shape at the elevated temperatures typically employed in fusing systems, such as up to about 230° C. In general, the cured fluorocarbon random copolymer material has subunits of the following:

$$—(CH_2CF_2)x\text{-}, —(CF_2CF(CF_3))y\text{-}, \text{ and } —(CF_2CF_2)z\text{-}$$

wherein:

x is from about 1 to about 50 or from about 60 to about 80 mole percent, y is from about 10 to about 89 mole percent, z is from about 10 to about 89 mole percent, and x+y+z equals 100 mole percent.

The foregoing subunits can also be described as follows:

$—(CH_2CF_2)—$ is a vinylidene fluoride subunit ("$VF_2$"), $—(CF_2CF(CF_3))—$ is a hexafluoropropylene subunit ("HFP"), and $—(CF_2CF_2)—$ is a tetrafluoroethylene subunit ("TFE").

In the above formulas, x, y, and z are mole percentages of the individual subunits relative to a total of the three subunits (x+y+z), referred to herein as "subunit mole percentages". The curing agent can be considered to provide an additional "cure-site subunit"; however, the contribution of these cure-site subunits is not considered in subunit mole percentages. In the fluorocarbon thermoplastic random copolymer, x has a subunit mole percentage of from about 1 to about 50 or about 60 to about 80 mole percent, y has a subunit mole percentage of from about 10 to about 89 mole percent, and z has a subunit mole percentage of from about 10 to about 89 mole percent. In a currently preferred embodiment, subunit mole percentages are: x is from about 30 to about 50 or about 70 to about 80, y is from about 10 to about 20, and z is from about 10 to about 50; or more preferably x is from about 40 to about 50, y is from about 10 to about 15, and z is about 40 to about 50. In the currently preferred embodiments, x, y, and z are selected such that fluorine atoms represent at least about 65 mole percent of the total formula weight of the $VF_2$, HFP, and TFE subunits.

Suitable fluorocarbon thermoplastic random copolymers (in uncured form) employed in practicing the invention are available commercially. In a particular embodiment of the invention, a vinylidene fluoride-co-tetrafluoroethylene-co-hexafluoropropylene is used which can be represented as -(VF)(75)-(TFE)(10)-(HFP)(25)-. This material is marketed by Hoechst Company under the designation "THV Fluoroplastics" and is referred to herein as "THV". In another embodiment, a vinylidene fluoride-co-tetrafluoroethylene-co-hexafluoropropylene is used which can be represented as -(VF)(49)-(TFE)(41)-(HFP)(10)-. This material is marketed by the Minnesota Mining and Manufacturing Company, St. Paul, Minn., under the designation "3M THV" and is referred to herein as "THV-200A". Other suitable uncured vinylidene fluoride-co-hexafluoropropylenes and vinylidene fluoride-co-tetrafluoroethylene-cohexafluoropropylenes are available, for example, as THV-400, THV-500, and THV-300, also from 3M.

In general, THV fluoroplastics are set apart from other melt-processable fluoroplastics by a combination of high flexibility and low processing temperatures. With flexural modulus values between about 83 Mpa and about 207 Mpa, THV fluoroplastics are generally the most flexible of the fluoroplastics.

The molecular weight of the uncured polymer is largely a matter of convenience, however, an excessively large or excessively small molecular weight would create problems, the nature of which are well known to those skilled in the art. In a preferred embodiment of the invention the uncured polymer has a number average molecular weight in the range of about 100,000 to about 200,000.

The curing agent is preferably a bisphenol residue. By the term "bisphenol residue", it is meant bisphenol or a derivative such as bisphenol AF. The composition of outer layer 37 further includes a particulate reactive filler including zinc oxide, and also an aminosiloxane. The aminosiloxane is preferably an amino-functionalized poly(dimethylsiloxane) copolymer, more preferably an amino-functionalized poly (dimethylsiloxane) (due to availability) comprising amino-functional units selected from the group consisting of (aminoethylaminopropyl) methyl, (aminopropyl) methyl and (aminopropyl) dimethyl.

A fluorinated polymer resin, which acts as a release agent, and having no C—H bond in the polymer backbone, such as polytetrafluoroethylene (PTFE), polyfluoroethylenepropylene (FEP), polytetrafluoroethylene-co-polyperfluoro-propylvinylether (PFA), or mixtures thereof, is incorporated into the copolymer in an amount to adjust gloss to a desired level for the contact surface of outer layer 37 of the resulting fuser roller 31, pressure roller 32, or both, which will also adjust gloss for the resulting fused toner image. In general, the gloss for a fused toner image will be higher than the gloss for the contact surface, and in some instances as high as 2.5 times the gloss of the contact surface. Such fluorinated resins are commercially available from DuPont. Fluorinated resins can have a number average molecular weight of from about 50,000 to about 50,000,000, preferably from about 200,000 to about 1,000,000.

The amount of fluorinated resin employed can vary significantly according to the invention. Preferably, the amount of fluorinated resin ranges from about 2 parts to about 50 parts by weight, per 100 parts (pph) of the fluorocarbon thermoplastic random copolymer employed.

A preferred class of curable amino-functional siloxanes, based on availability, includes those having functional groups such as aminopropyl or aminoethylaminopropyl pendant from a poly(siloxane) backbone (more preferably a poly(dimethylsiloxane) backbone), such as DMS-A11, DMS-A12, DMS-A15, DMS-A21 and DMS-A32 (all sold by Gelest, Inc. of Tullytown, Pa.) having a number average molecular weight between 850 and 27,000. Examples of preferred curable amino-functional polydimethyl siloxanes are bis(aminopropyl) terminated poly(dimethylsiloxanes). Such oligomers are available in a series of molecular weights as disclosed, for example, by Yilgor et al., in "Segmented Organosiloxane Copolymer", Polymer, 1984, V. 25, pp. 1800–1806. Other curable amino-functional polydimethyl siloxanes that can be used are disclosed in U.S. Pat. Nos. 4,853,737 and 5,157,445, the disclosures of which are also hereby incorporated by reference.

The cured fluorocarbon thermoplastic random copolymer compositions include a reactive filler comprising zinc oxide. The zinc oxide particles can be obtained from any convenient commercial source, such as Atlantic Equipment Engineers of Bergenfield, N.J. In a currently preferred embodiment, the particulate zinc oxide filler has a total concentration in the compositions of the invention of from about 1 to 20 parts per hundred parts by weight of the fluorocarbon thermoplastic random copolymer (pph). In a particular embodiment of the invention, the composition has about 3 to 15 pph of zinc oxide.

The particle size of the zinc oxide filler does not appear to be critical. Particle sizes anywhere in the range of about 0.1 to 100 micrometers are acceptable.

In addition to using zinc oxide filler as provided hereinabove, antimony-doped tin oxide particles can be added as a catalyst so that curing of the fluorocarbon thermoplastic random copolymer can be achieved with shorter reaction times and/or at temperatures of as low as room temperature, i.e., about 25° C. This technique is disclosed in copending U.S. patent application Ser. No. 09/609,562 filed on Jun. 30, 2000, the teachings of which have been incorporated herein by reference in their entirety. Antimony-doped tin oxide particles can be obtained from Keeling & Walker, Stoke-on-Trent, of the United Kingdom; E.I. du Pont de Nemours and Company of Wilmington, Del., or Mitsubishi Metals, Inc. of Japan. A preferred amount of such antimony-doped tin oxide is from about 3 to about 20 pph by weight of the fluorocarbon thermoplastic random copolymer composition employed, and more preferably from about 3 to about 15 pph. The amount of antimony in such particles is preferably from about 1 to about 15 weight percent, based on total weight of the particles, and more preferably from about 3 to about 10 weight percent.

In addition to the zinc oxide reactive filler, the outer layer 37 can further comprise, as an optional component, a particulate thermally-conductive filler material, such as those previously mentioned for the base cushion layer. However, such fillers only provide low temperature curing catalyst, and are not preferred, since they can promote contamination of the finishing member with toner and reduce overall gloss to an undesired level. Thus, high gloss layers require only tin oxide.

Preferred cured fluorocarbon thermoplastic random copolymer compositions employed for the outer layer have a weight ratio of aminosiloxane polymer to fluorocarbon thermoplastic random copolymer of between about 0.01 and about 0.2 to 1 by weight, and preferably from between about 0.05 and about 0.15 to 1. The composition is preferably obtained by curing a mixture comprising from about 45–90 weight percent of a fluorocarbon thermoplastic random copolymer; about 5–20 weight percent, most preferably about 5–10 weight percent, of a curable amino-functional siloxane copolymer; about 1–5 weight percent of a bisphenol residue, about 1–20 weight percent of a zinc oxide acid acceptor type filler, and about 3–45 weight percent of fluorinated resin, based on total weight of the composition.

To form the outer layer composition in accordance with the present invention, known solution coating methods can be used, wherein the uncured fluorocarbon thermoplastic random copolymer, fluorinated resin, reactive filler including zinc oxide, aminosiloxane, bisphenol residue curing agent, and any other desired additives, are mixed in an organic solvent such as methylethylketone or methylisobutylketone. The solution is then applied to a core or other substrate (with base cushion layer, if desired, already coated thereon), and thereafter cured as described hereinafter.

The fluorocarbon thermoplastic random copolymer and fluorinated resin mixture is essentially cured by crosslinking with basic nucleophile addition curing. Basic nucleophilic cure systems are in general known and are discussed, for example, in U.S. Pat. No. 4,272,179. One example of such a cure system combines a bisphenol residue as the curing agent and an organophosphonium salt, as an accelerator. The curing agent is incorporated into the polymer as a cure-site subunit, for example, bisphenol residues. Other examples of nucleophilic addition cure systems are sold commercially as DIAK No. 1 (hexamethylenediamine carbamate) and DIAK No. 3 (N,N'-dicinnamylidene-1,6-hexanediamine) by DuPont.

Curing of the mixture comprising the fluorocarbon thermoplastic random copolymer and fluorinated resin can be attained by heating the uncured mixture for about 3 hours or more at a temperature of 220° C. to 280° C. and an additional 2 hours at a temperature of 250° C. to 270° C. If antimony-doped tin oxide particles are employed, then the mixture can be cured at a temperature of as low as 25° C. over a period of at least about 2 hours.

The outer layer 37 desirably has a thermal conductivity of from about 0.15 to about 0.40 BTU/hr-ft-° F. when an internal heat source, such as lamp 39, is used, so that the outer layer has sufficient heat capacity to effectively conduct heat to the receiver sheet. Thermal conductivity of the outer layer can be adjusted by varying the thickness of the outer layer so as to obtain a desired level of thermal conductivity, or alternatively, but less preferred, thermally-conductive fillers as described above, can be added. Thermal conductivity can be measured by the procedure and equipment described in ASTM Method F433-77.

The outer layer 37 should be at least about 0.5 mils (12.5 μm) in thickness to have a desirable amount of mechanical strength and/or heat storage capacity, and preferably it has a thickness of from about 1 mil (25 μm) to about 4 mils (100 μm). A thickness of greater than 4 mils is less preferred, since the outer layer will tend to act as a heat sink and heat transfer can be inefficient.

In terms of hardness, the outer layer preferably has a Durometer hardness of greater than about 20 Shore A, and preferably from about 50 to about 80 Shore A as determined by accepted analytical methods known in the art, i.e., ASTM Standard D2240, as mentioned in U.S. Pat. No. 5,716,714, the relevant teachings of which are incorporated herein by reference.

In practicing the invention, the conditions at which contact occurs between the contact surface of the outer layer 37 and toner image can vary. An advantage of the cured fluorocarbon thermoplastic random copolymer composition employed in the outer layer is its ability to withstand elevated temperatures commonly employed in fusing toner images. In preferred embodiments, the surface temperature of the outer layer of the finishing member during contact is from about 140° C. to about 230° C., and more preferably from about 140° C. to about 180° C. The pressure within the contact nip is preferably from about 20 to about 120 pounds per square inch (psi), and more preferably from about 50 to about 100 psi.

A release agent, such as a polysiloxane oil, can be applied to the surface of the fuser roller to reduce or prevent offset of toner onto the fuser roller during fusing. The release agents employed can be any of those known to the art, including those with functional groups in either a terminal position on the siloxane polymer chain, or pendant to such siloxane chain, or both, such as those release agents disclosed in U.S. Pat. Nos. 4,029,827; 4,101,686; 4,185,140; and 5,157,445 the teachings of which are incorporated by reference, which groups can interact with the contact surface of outer layer 37 of fuser roller 31 such that a thin film of the polymeric release agent is formed on the contact surface. In embodiments, the functional groups include carboxy, hydroxy, epoxy, isocyanate, thioether, hydride, amino, or mercapto groups, and preferably hydride, amino or mercapto groups. Blends of such release agents may also be used.

FIGS. 1 and 2 show two different fusing systems; however, it should be understood that any fusing system known to the art can be employed.

Any receiver known in the art can be used in the method and apparatus of this invention, including various metal films, such as alumina and copper, metal-coated plastic films, organic polymeric films, and various types of paper. Polyethylene terephthalate is an excellent transparent polymeric receiver for forming transparencies. The most preferred receivers are paper and coated papers like those disclosed in U.S. Pat. No. 5,037,718.

Any toners can be used in the method and apparatus of this invention. Useful toner binder polymers include vinyl polymers, such as homopolymers and copolymers of styrene and condensation polymers such as polyesters and copolyesters, as well as polyethers. Also especially useful are polyesters of aromatic dicarboxylic acids with one or more aliphatic diols, such as polyesters of isophthalic or terephthalic acid with diols such as ethylene glycol, cyclohexane dimethanol and bisphenols. Preferred toners are those with a relatively low viscosity of from about 3,000 to about 10,000 poise, such as those which use non-crosslinked polyesters and polyether resins as a binder resin.

Binder materials useful in the toner particles used in the method of this invention can be amorphous or semicrystalline polymers. The amorphous toner binder compositions have a Tg in the range of about 45° C. to 120° C., and often from about 50° C. to 70° C. The useful semi-crystalline polymers have a Tm in the range of about 50° C. to 150° C., and more preferably between about 60° C. and 125° C. The thermal characteristics, such as Tg and Tm, can be determined by conventional methods, e.g., differential scanning calorimetry (DSC).

Numerous colorant materials selected from dyestuffs or pigments can be employed in the toner particles used in the invention. Such materials serve to color the toner and/or render it more visible. Suitable toners can be prepared without the use of a colorant material where it is desired to have developed toner image of low optical densities. In those instances where it is desired to utilize a colorant, the colorants can, in principle be selected from virtually any of the compounds mentioned in the Colour Index Volumes 1 and 2, Second Edition. Suitable colorants include those typically employed in cyan, magenta and yellow colored toners. Such dyes and pigments are disclosed, for example, in U.S. Reissue Pat. No. 31,072 and in U.S. Pat. Nos. 4,160,644; 4,416,965; 4,414,152; and 2,229,513. One particularly useful colorant for toners to be used in black and white electrostatographic copying machines and printers is carbon black. The amount of colorant added may vary over a wide range, for example, from about 1 to 40 percent of the weight of binder polymer used in the toner particles. Mixtures of colorants can also be used.

Another component of the toner composition is a charge control agent. The term "charge control" refers to a propensity of a toner addendum to modify the triboelectric charging properties of the resulting toner. A very wide variety of charge control agents for positive charging toners are available. A large, but lesser number of charge control agents for negative charging toners is also available. Suitable charge control agents are disclosed, for example, in U.S. Pat. Nos. 3,893,935; 4,079,014; 4,323,634; 4,394,430; and British Patent Nos. 1,501,065; and 1,420,839. Charge control agents are generally employed in small quantities such as, from about 0.1 to about 5 weight percent based upon the weight of the toner. Additional charge control agents which are useful are described in U.S. Pat. Nos. 4,624,907; 4,814,250; 4,840,864; 4,834,920; 4,683,188; and 4,780,553. Mixtures of charge control agents can also be used.

Another component which can be present in the toner composition useful in this invention is an aliphatic amide or aliphatic acid. Suitable aliphatic amides and aliphatic acids are described, for example, in Practical Organic Chemistry, Arthur I. Vogel, 3rd Ed. John Wiley and Sons, Inc. NY (1962); and Thermoplastic Additives: Theory and Practice, John T. Lutz Jr. Ed., Marcel Dekker, Inc, NY (1989). Particularly useful aliphatic amide or aliphatic acids have from 8 to about 24 carbon atoms in the aliphatic chain. Examples of useful aliphatic amides and aliphatic acids include oleamide, eucamide, stearamide, behenamide, ehthylene bis(oleamide), ethylene bis(stearamide), ethylene bis (behenamide) and long chain acids including stearic, lauric, montanic, behenic, oleic and tall oil acids. Particularly preferred aliphatic amides and acids include stearamide, erucamide, ethylene bis-stearamide and stearic acid. The aliphatic amide or aliphatic acid is present in an amount from about 0.5 to 30 percent by weight, preferably from about 0.5 to 8 percent by weight. Mixtures of aliphatic amides and aliphatic acids can also be used.

One useful stearamide is commercially available from Witco Corporation as KEMAMIDE S. A useful stearic acid is available from Witco Corporation as HYSTERENE 9718.

The toner can also contain other additives of the type used in previous toners, including magnetic materials, such as magnetite, pigments, leveling agents, waxes, surfactants, stabilizers, and the like. The total quantity of such additives can vary. A present preference is to employ not more than about 10 weight percent of such additives on a total toner powder composition weight basis.

Toners can optionally incorporate a small quantity of low surface energy material, as described in U.S. Pat. Nos. 4,517,272 and 4,758,491. Optionally, the toner can contain a particulate additive on its surface such as the particulate additive disclosed in U.S. Pat. No. 5,192,637.

The toner compositions of the invention can be made according to a process like the evaporative limited coalescence process described in U.S. Pat. No. 4,883,060, the disclosure of which is hereby incorporated by reference.

The toner can also be surface treated with small inorganic particles, such as metal oxides like titanium oxide, silica, and mixtures thereof, to impart powder flow, cleaning and/or improved transfer.

The toners applied to the receiver in this invention can be part of a developer which comprises a carrier and the toner. Carriers can be conductive, non-conductive, magnetic, or non-magnetic. Carriers are particulate in nature and can be glass beads; crystals of inorganic salts such as aluminum potassium chloride, ammonium chloride, or sodium nitrate; granules of zirconia, silicon, or silica; particles of hard resin such as poly(methyl methacrylate); and particles of elemental metal or alloy or oxide such as iron, steel, nickel, carborundum, cobalt, oxidized iron and mixtures of such materials. Examples of carriers are disclosed in U.S. Pat. Nos. 3,850,663 and 3,970,571. Especially useful in magnetic brush development are iron particles such as porous iron, particles having oxidized surfaces, steel particles, and other "hard" and "soft" ferromagnetic materials such as gamma ferric oxides or ferrites of barium, strontium, lead, magnesium, or aluminum. Such carriers are disclosed in U.S. Pat. Nos. 4,042,518; 4,478,925; 4,764,445; 5,306,592; and 4,546,060.

Carrier particles can be uncoated or can be coated with a thin layer of a film-forming resin to establish the correct triboelectric relationship and charge level with the toner employed. Examples of suitable resins are the polymers described in U.S. Pat. Nos. 3,547,822; 3,632,512; 3,795,618; and 3,898,170 and Belgian Patent No. 797,132. One currently preferred carrier coating is a mixture of poly(vinylidene fluoride) and poly(methyl methacrylate) as described for example in U.S. Pat. Nos. 4,590,140; 4,209,550; 4,297,427 and 4,937,166.

In a particular embodiment, the developer comprises a mixture of from about 1 to about 20 percent by weight of toner and from about 80 to about 99 percent by weight of carrier particles. Usually, carrier particles are larger than toner particles. Conventional carrier particles have a particle size of from about 5 to about 1200 micrometers and are preferably from 20 to 200 micrometers.

The term "particle size" used herein, or the term "size", or "sized" as employed herein in reference to the term "particles", means the median volume weighted diameter as measured by conventional devices, such as a Coulter Multisizer, sold by Coulter, Inc. of Hialeah, Fla. Median volume weighted diameter is the diameter of an equivalent weight spherical particle which represents the median for a sample.

By gloss of a fused toner image, it is meant the G60 gloss (as described hereinafter) for the fused image. Gloss can be measured by use of a specular glossmeter using conventional techniques well known to those in the art, for example, the method described in ASTM-523-89 (1999).

In the examples described hereinafter, the Gardner gloss value is essentially a ratio determined by measuring the amount of light reflected off a fused toner image at a specific angle measured from a line perpendicular to the surface of the image, and dividing the foregoing by the amount of light introduced to the image at the same angle on the opposite side of the perpendicular line. The angles off the perpendicular line at which the gloss measurements are commonly taken are 20°, 60°, and 85° using a Gardner Micro-TRI-Gloss 20-60-85 Glossmeter, available from BYK Gardner USA of Rivers Park, Md. The gloss value as measured by the Gardner Glossmeter is often reported as a G next to a number representing the size of the specific angle used in measuring gloss, that is for example, G20, G60, and G85. As used herein, Gardner gloss levels are measured at an angle of 60° (and therefore recited as a G60 gloss value) unless otherwise stated.

The measured G60 gloss for a fused toner images formed according to this invention are typically at least about 10 (in terms of G60 gloss units), and as high as 100. Preferably, the fused toner image has a G60 gloss of from about 15 to about 90.

Similarly, the Gardner Glossmeter can be used to measure gloss of the contact surface of the fuser member, i.e., the surface which contacts the thermoplastic toner image, such as the contact surface on belt 52 of FIG. 1 or fuser roller 31 of FIG. 2. As mentioned above, the gloss of the contact surface of the fusing member employed can be selected (by incorporation of a measured amount of the fluorinated resin therein—see Examples 1 to 6 hereinafter), such that upon using the fusing member to fuse a thermoplastic toner image, a fused toner image is obtained having a desired gloss level. Typically, the G60 gloss for the fused toner image is about 2.5 times the G60 gloss of the contact surface of the fusing member. The G60 gloss of the contact surface can have a value up to about 35 based on currently available materials. Preferably, the G60 gloss of the contact surface is from about 5 to about 32, and more preferably from about 6 to about 15.

The preparation of fusing members having a pre-selected gloss adjustment of gloss for a toner image according to the present invention is illustrated by the following examples and comparative examples.

SPECIFIC EMBODIMENTS OF THE INVENTION

The following examples are intended to illustrate specific embodiments of the present invention and should not be construed as limiting the scope thereof. Unless otherwise indicated, all parts and percentages are by weight and temperatures are in degrees Celsius (° C.).

EXAMPLES 1–6

In each of Examples 1–6, initially a core consisting of a cylindrical aluminum tube having a length of 15.2 inches and an outer diameter of 3.5 inches is cleaned with dichloromethane and dried. The outer surface of the core is then primed with a uniform coat of a silicone primer, i.e., GE 4044 silicone primer available from GE Silicones of Waterford, N.Y. The core is then air dried.

A silicone base cushion layer is then applied to the so-treated core. Initially, a silicone mixture is first prepared by mixing in a three roll mill 100 parts of EC-4952 (a hydroxy-terminated poly(dimethylsiloxane) base compound) obtainable from Emerson Cuming Silicones Division of W.R. Grace and Co. of Lexington, Mass. The EC-4952 base compound is believed to contain a hydroxy-terminated poly(dimethylsiloxane) polymer with about 33% by weight, based on the weight of the EC-4952 base compound, of aluminum oxide and iron oxide therein as thermally conductive fillers. The EC 4952 base compound includes a cross-linking agent which is added by the manufacturer. An effective amount (about 1 part catalyst to 300 parts base compound) of dibutyltin diacetate catalyst is added to the mill to initiate curing of the material according to the manufacturer's directions.

The above-described silicone mixture is then degassed and blade coated onto the core according to conventional methods. The so-coated core is maintained at room temperature, i.e. a temperature of 25° C., for about 24 hours. The core is then placed in a convection oven wherein the temperature therein is ramped to 410° F. (210° C.) over a period of 12 hours, followed by an 48 hour hold at 410° F. (210° C.) to substantially complete curing of the silicone mixture. The so-coated core is then allowed to cool to room temperature, and the poly(dimethylsiloxane) base cushion layer is thereafter ground to provide a layer having a thickness of about 5 mm (200 mils). The base cushion is then subjected to corona discharge treatment at a power level of 750 watts for 15 minutes.

Thereafter, an outer layer of thermoplastic fluorocarbon random copolymer co-cured with a fluorinated resin is applied to the so-coated core. Initially, for each of Examples 1–6, a fluorocarbon mixture is prepared by mixing in a two roll mill 100 parts of THV 200A fluorocarbon thermoplastic random copolymer, 7.44 parts of zinc oxide particles, 10 parts of aminosiloxane and, depending on the particular example, an amount (in parts) of polyfluoroethylenepropylene (FEP) resin as shown in Table I below. Examples 1 to 6, therefore employ substantially the same materials in each respective mixture, except that the amount of FEP resin employed varies from 7.5 parts (Example 1) to 44 parts (Example 6). THV200A is a commercially available fluorocarbon thermoplastic random copolymer sold by 3M Corporation of St. Paul, Minn. The zinc oxide particles are available from Atlantic Equipment Engineers of Bergenfield, N.J. The aminosiloxane is DMS-A21, commercially available from Gelest, Inc of Tullytown, Pa. The fluorinated resin, polyfluoroethylenepropylene (FEP), is commercially available from DuPont of Wilmington, Del. Each mixture also includes 2 parts of Curative 50, also available from DuPont. The mixture is thoroughly mixed and thereafter used to form a 15 weight percent solution of the mixture in methylethylketone.

Part of the above-described solution is then ring coated by well known methods over the cured polysiloxane base cushion overlying the core. The so-coated core is then air dried for 16 hours, baked with a 2.5 hour ramp to 275° C., given a 30 minute soak at 275° C., and then held 2 hours at 260° C. The resulting layer of cured fluorocarbon thermoplastic random copolymer has a thickness of 1 mil.

After curing and cooling of the fuser member to room temperature (25° C.), the resulting fuser member is analyzed to determine its G60 gloss by using the Gardner Micro-TRI-Gloss 20-60-85 Glossmeter previously mentioned above. A gloss measurement with the Glossmeter is taken at 6 different locations on the fuser member, and the values are then averaged to obtain a nominal G60 gloss for the fuser member. A similar averaging procedure is used, if desired, to determine the G60 gloss for a fused toner image obtained by using the fuser member, and the resulting nominal value should lie within the range previously described herein. The G60 gloss values (nominal) for the contact surface (outer surface of the coated core) obtained in each example are shown in Table I.

TABLE I

Data for Examples 1–6

| Example No. | FEP Amount (pph) | Fuser Roller G60 Gloss |
|---|---|---|
| 1 | 7.5 | 15 |
| 2 | 10.0 | 12 |
| 3 | 12.0 | 10 |
| 4 | 15.0 | 9 |
| 5 | 18.5 | 8 |
| 6 | 44.0 | 6 |
| A | 0.0 | 32 |

COMPARATIVE EXAMPLE A

The procedure of Examples 1–6 is substantially repeated, except that no FEP resin is employed. The data obtained is shown in Table I for comparison purposes.

Figure 3:
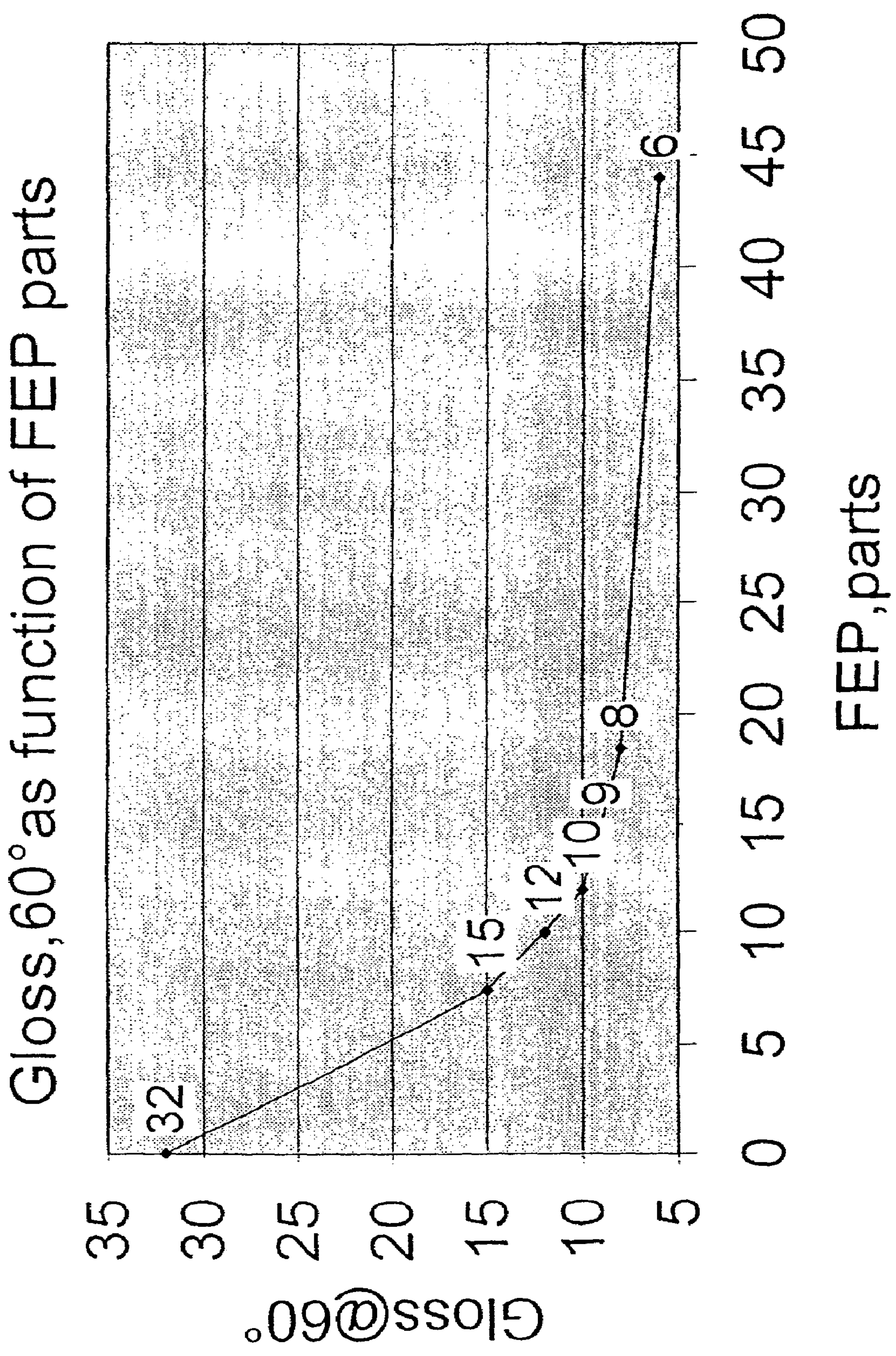
FIG. 3 is a graph of fuser member contact surface G60 gloss versus fluorinated resin (FEP) content for Examples 1 to 6 and Comparative Example A described below.

The data in Table I show that a fuser member having no FEP resin therein displays the highest level of G60 gloss for the fuser member contact surface, with a value of 32. As the amount of FEP is increased in the contact surface layer, the gloss for the resulting contact surface of the fuser member drops. The relationship between the G60 Gloss of the fuser member contact surface and amount of FEP resin employed is also shown in FIG. 3. Thus, using the curve in FIG. 3, one can prepare a fuser member having a desired amount of G60 gloss for the contact surface thereof, which member can then by used to provide a desired G60 gloss for a fused thermoplastic toner image.

When a fuser member prepared as described in Examples 1 to 6 is used to fix thermoplastic toner particles onto a receiver, such as paper, in an electrophotographic device, the resulting fused toner image has a G60 gloss of about 2.5 times the fuser member contact surface G60 gloss, or from about 15 (2.5×6) up to 80 (2.5×32) for the examples described hereinabove.

The ability to produce a fuser member which can fuse toner images to a desired level of gloss is particularly advantageous for a digital color press that employs at least three different colors of toners (magenta, cyan, and yellow) and optionally, a black toner, comprised of a thermoplastic binder resin, pigment, and other addenda as known in the art.

Although the present invention has been described in detail with particular reference to the preferred embodiments recited above, it will be understood that variations and modifications can be effected within its scope and spirit.

We claim:

1. A fuser member comprising a support and a layer overlying the support, said layer consisting of a cured mixture of a fluorocarbon thermoplastic random copolymer, a curing agent having a biphenol residue, a zinc oxide acid accelerator, a fluorinated resin having a number average molecular weight of from about 50,000 to about 50,000,000, and an aminosiloxane, the cured fluorocarbon thermoplastic random copolymer having subunits of:

$$—(CH_2CF_2)x\text{-}, —(CF_2CF(CF_3))y\text{-}, \text{ and } —(CF_2CF_2)z\text{-},$$

wherein:

x is from 1 to 50 or 60 to 80 mole percent, y is from 10 to 89 mole percent, z is from 10 to 89 mole percent, x+y+z equals 100 mole percent, and the layer having a contact surface with a G60 gloss of up to about 35.

2. The fuser member of claim 1 wherein the fluorinated resin is present in an amount of from about 2 to about 50 parts by weight per 100 parts of the fluorocarbon thermoplastic random copolymer.

3. The fuser member of claim 1 wherein the layer has a G60 gloss of from about 5 to about 32.

4. The fuser member of claim 1 wherein the layer has a G60 gloss of from about 6 to about 15.

5. The fuser member of claim 1 wherein the fluorinated resin is selected from polytetrafluoroethylene (PTFE), polyfluoroethylenepropylene (FEP), polytetrafluoroethylene-co-polyperfluoropropylvinylether (PFA), or mixtures thereof.

6. The fuser member of claim 1 wherein the fluorinated resin is polyfluoroethylenepropylene (FEP).

7. The fuser member of claim 1 wherein the aminosiloxane is an amino functional polydimethyl siloxane copolymer.

8. The fuser member of claim 7 wherein the amino functional polydimethyl siloxane copolymer comprises amino functional units selected from the group consisting of (aminoethylaminopropyl) methyl, (aminopropyl) methyl and (aminopropyl) dimethyl.

9. The fuser member of claim 7 wherein the fluorocarbon thermoplastic random copolymer is cured by bisphenol residues.

10. The fuser member of claim 1 wherein the amino siloxane is present in an amount of from about 1 to about 20 parts by weight per 100 parts of the fluorocarbon thermoplastic random copolymer.

11. The fuser member of claim 1 wherein the acid accelerator is zinc oxide present in an amount of from about 1 to about 20 parts by weight per 100 parts of the fluorocarbon thermoplastic random copolymer.

12. The fuser member of claim 1 wherein the acid accelerator is zinc oxide is present in an amount of from about 3 to about 15 parts by weight per 100 parts of the fluorocarbon thermoplastic random copolymer.

13. The fuser member of claim 1 wherein the fluorocarbon thermoplastic random copolymer is nucleophilic addition cured.

14. The fuser member of claim 1 wherein x is from 30 to 50 mole percent, y is from 10 to 89 mole percent, and z is from 10 to 89 mole percent.

15. The fuser member of claim 1 wherein x is from 40 to 50 mole percent and y is from 10 to 15 mole percent.

16. The fuser member of claim 1 wherein z is greater than 40 mole percent.

17. The fuser member of claim 1 wherein the fluorinated resin has a number average molecular weight of between about 200,000 to about 1,000,000.

* * * * *